United States Patent
Owen

(10) Patent No.: US 10,781,750 B2
(45) Date of Patent: Sep. 22, 2020

(54) SYSTEM FOR REDUCING INLET AIR TEMPERATURE OF A DEVICE

(71) Applicant: AAF Ltd, Northumberland (GB)

(72) Inventor: Charles Melvin Owen, Newcastle upon Tyne (GB)

(73) Assignee: AAF Ltd, Northumberland (GB)

( * ) Notice: Subject to any disclaimer, the term of this patent is extended or adjusted under 35 U.S.C. 154(b) by 0 days.

(21) Appl. No.: 15/738,942

(22) PCT Filed: Jun. 23, 2016

(86) PCT No.: PCT/IB2016/053745
§ 371 (c)(1),
(2) Date: Dec. 21, 2017

(87) PCT Pub. No.: WO2016/207829
PCT Pub. Date: Dec. 29, 2016

(65) Prior Publication Data
US 2018/0172294 A1 Jun. 21, 2018

Related U.S. Application Data

(63) Continuation of application No. 14/749,154, filed on Jun. 24, 2015, now abandoned.

(51) Int. Cl.
*F02C 7/057* (2006.01)
*F02C 7/052* (2006.01)
(Continued)

(52) U.S. Cl.
CPC ............ *F02C 7/057* (2013.01); *F02C 7/052* (2013.01); *F02C 7/1435* (2013.01);
(Continued)

(58) Field of Classification Search
CPC .... F24F 5/0035; F24F 6/00; F24F 6/02; F24F 6/12; F24F 6/14; F24F 6/16;
(Continued)

(56) References Cited

U.S. PATENT DOCUMENTS 4,511,084 A * 4/1985 Won .................. B05B 3/02
239/223
4,609,145 A * 9/1986 Miller ................ A01M 7/0014
239/159
(Continued)

FOREIGN PATENT DOCUMENTS

JP H06341356 A 12/1994
JP 2011-214476 A 10/2011
(Continued)

OTHER PUBLICATIONS

International Search Report and Written Opinion dated Oct. 4, 2016, for International Patent Application No. PCT/IB2016/053745, Owen, "System for reducing inlet air temperature of a device," filed Jun. 23, 2016 (12 pages).
(Continued)

*Primary Examiner* — Joseph F Trpisovsky
(74) *Attorney, Agent, or Firm* — Clark & Elbing LLP; Susan M. Michaud

(57) ABSTRACT

The present embodiments disclose a system for reducing inlet air temperature of a device, including: an air inlet, a fogging system that provides air cooling, wherein the fogging system includes at least one low pressure rotary atomiser working at a pressure that is, for example, between 0.5 and 6 bar, and one or more air filters.

20 Claims, 8 Drawing Sheets

(51) Int. Cl.
*F02C 7/143* (2006.01)
*F24F 11/46* (2018.01)
*F24F 11/30* (2018.01)
*F24F 5/00* (2006.01)

(52) U.S. Cl.
CPC .......... *F24F 5/0035* (2013.01); *F24F 11/30* (2018.01); *F24F 11/46* (2018.01); *F05D 2270/16* (2013.01); *F05D 2270/3015* (2013.01); *F05D 2270/311* (2013.01)

(58) Field of Classification Search
CPC . F24F 2006/143; F24F 2006/146; B05B 3/00; B05B 3/02; B05B 3/1085; B05B 5/04; B05B 5/0422
USPC ................................ 62/121, 259.4, 247, 304
See application file for complete search history.

(56) References Cited

U.S. PATENT DOCUMENTS

| | | | |
|---|---|---|---|
| 5,501,401 A | 3/1996 | Munk | |
| 5,524,848 A * | 6/1996 | Ellsworth | B64D 13/00 244/118.5 |
| 6,216,443 B1 * | 4/2001 | Utamura | F01K 21/047 181/214 |
| 6,478,289 B1 | 11/2002 | Trewin | |
| 6,553,768 B1 | 4/2003 | Trewin et al. | |
| 7,934,702 B1 * | 5/2011 | Feldstein | F24F 6/14 261/4 |
| 2006/0059919 A1 | 3/2006 | Leachman et al. | |
| 2006/0254283 A1 | 11/2006 | Savic et al. | |
| 2007/0240433 A1 * | 10/2007 | Manole | F24F 3/1405 62/91 |
| 2010/0263541 A1 * | 10/2010 | Kippel | B01D 46/0082 96/233 |
| 2010/0326083 A1 * | 12/2010 | Bland | F02C 3/30 60/775 |
| 2011/0042836 A1 | 2/2011 | Zhang et al. | |
| 2013/0067922 A1 * | 3/2013 | Zhang | F02C 7/1435 60/772 |
| 2013/0205816 A1 * | 8/2013 | Aksuyek | F24F 5/0035 62/121 |
| 2014/0144124 A1 | 5/2014 | Mazumder et al. | |
| 2014/0225372 A1 | 8/2014 | Scheu et al. | |
| 2018/0320592 A1 | 11/2018 | Owen | |

FOREIGN PATENT DOCUMENTS

| | | |
|---|---|---|
| JP | 2016-053343 A | 4/2016 |
| WO | WO-03/089770 A1 | 10/2003 |
| WO | WO-2016/207828 A2 | 12/2016 |

OTHER PUBLICATIONS

International Search Report and Written Opinion dated Dec. 2, 2016, for International Patent Application No. PCT/IB2016/053744, Owen, "Method of running an air inlet system," filed Jun. 23, 2016 (17 pages).

* cited by examiner

SYSTEM FOR REDUCING INLET AIR TEMPERATURE OF A DEVICE

FIELD OF THE INVENTION

The present invention relate to a system for reducing inlet air temperature of a device. In particular, the present invention relates to fogging systems for the cooling of inlet air to a gas turbine, diesel engine, process blower, or other motive force. Additionally, these embodiments relate to the method of control for these fogging systems.

BACKGROUND OF THE INVENTION

Gas turbines and diesel engines provide motive force by compressing a near constant volume of air and igniting fuel to generate shaft power. This power may be used to drive generators used in the production of electricity or may be used to drive compressors or blowers used in oil and gas transmission or other processes. When the ambient air temperature rises, the density of the air decreases, causing the mass flow through the gas turbine to also decrease. The consequence of these is that as ambient temperature increases the gas turbines and diesel engines are prone to loss of output, while the fuel rate increases. Typically, gas turbines will lose about 0.7% to about 0.9% of their rated power output for each degree Celsius of inlet temperature increase.

Presently, the solution to this widespread problem is to install an inlet cooling system to redress the inlet air temperature. Common methods for this reduction in temperature include: the installation of cooling coils; the installation of media-type evaporative coolers; and, the installation of fogging systems, which generally cool the air temperature through the evaporation of water sprayed into the system following the filter stage. However, each of these types of systems has certain disadvantages.

Cooling coils and the associated plant are expensive, and provide an additional level of complexity to plant operations. Further, these types of systems cause a pressure differential in the air stream even when not in use.

Media-type evaporative coolers are relatively simple, but they cannot be adjusted to accommodate for changes in ambient air conditions. Additionally, the media used in these systems is prone to damage, and also presents a cause a pressure differential in the air stream year-round. Further, maintenance or replacement of media requires that the gas turbine or other downstream process be shut down.

Fogging systems introduce fog, in the form of water droplets, into the air. The introduced water droplets may then evaporate into the air, which creates a new equilibrium—a lower temperature and a higher relative humidity. From any given starting point, the system enthalpy remains unchanged; and, a temperature between the initial ambient temperature and the corresponding wet bulb temperature may be achieved by limiting the amount of water available. This process, known as fogging, is known and used in the art to combat the loss of power output that occurs when the ambient temperature increases. However, state of the art systems have many limitations and disadvantages. In order to address some of these limitations and disadvantages, the present disclosure splits fogging into two separate stages (one located before the filter, and one after the filter), and provides separate control systems for each stage of fogging.

Some early state of the art fogging systems were located upstream of inlet filters. Due to issues of increased filter pressure drop, current state of the art locates fogging systems downstream of the final stage of filtration. These current state of the art fogging systems require a large number of downstream high pressure nozzles in the clean air stream (the air stream after filtration) in order to avoid soaking of filter elements and in order to provide enough water to traverse from ambient temperature towards wet bulb temperature. Due to the placement of these nozzles in the clean air stream, the system must be stopped and broken into, or partially disassembled, for any modifications or repairs. Further, these system are only capable of being controlled at a coarse level. For example, a four stage pumping system offers a resolution of about 25% of turndown. Additionally, these systems recommend the use of demineralized water in order to avoid calcification of the fine nozzle openings. Finally, the large number of nozzles in the clean air duct presents a risk of foreign object damage, should a nozzle or part thereof become loose and fall into the air stream, to the downstream equipment.

Therefore, there exists a need in the art for a finely controlled fogging system that does not affect filtration performance and that minimizes, or eliminates, hardware in the clean air duct. There exists a need in the art for a system that can minimize, or eliminate, the utilization of demineralized water in the intake ducts. Further, such minimization, or elimination, of the use of demineralized water would minimize the deleterious effects of free water that may pool of the floor of the duct near the bell mouth of the compressor 10.

SUMMARY OF THE INVENTION

The present disclosure is particularly directed towards a system for reducing inlet air temperature of a device, comprising: a fogging system that provides air cooling, wherein the fogging system comprises at least one low pressure atomiser. Hereinafter a low pressure atomiser is defined as to be an atomiser working at low water pressure, which is between 0.5 and 6 bar, preferably between 1 and 4 bar. Such atomisers are able to provide water drops at which the droplet size is mainly independent of the water flow rate through the atomiser. The atomsing nozzle of such atomisers shatters liquids, in particular water, into micro fine droplets ranging from 20 micron down to 1 micron. Preferably the atomiser according to the invention is designed as to be a rotary atomiser. Alternatively the atomiser can be an ultrasonic atomiser. Such ultrasonic atomisers particularly use a compressed air supply at 5 bar and liquid supply at 1 bar. This system according to the invention is to be particularly advantageous when the humidity of the inlet air is low, preferably lower than 80% relative humidity. Then, there is an extra strong cooling effect by evaporation of water drops of the at least one low pressure atomiser, in particular rotary atomiser. The invention enables to use low water pressure and a simple nozzle design. Further, different sorts of water can be used.

The device is preferably protected by air filtration, and the fogging system is preferably located upstream or downstream of one or more inlet air filters. At the system according to the invention, droplet size is a function of a rotating screen shape and its rotational speed (RPM). It is mainly independent of the water flow rate to the rotary atomisers. Thus water flow rate can be adjusted independently, or water flow rate changes will not affect the droplet size, thus not affecting the time it requires for the droplets to fully evaporate. Thus according to the invention drops will not end up in the device to be cooled or on filters which follow the fogging system.

The rotary atomisers according to the invention may have a high water capacity (of approximately 3 l/min) compared to high pressure fogging nozzles (approximately 0.1 l/min). Therefore much fewer atomiser units are required.

The fogging system preferably is located upstream of the one or more inlet air filters. The inlet air filters can then be used to filter all remaining water drops out of the inlet air to be delivered to the device. If the atomisers are positioned in front of the filters, these filters may further filter out those solid components of the low purity water, that would otherwise enter the turbine on fogging systems installed behind the filters. At turbines, to access a clean air side of an air intake of the turbine downstream of filters, a shut down of the turbine is required. However, scheduled shut downs of such turbines are rare. Two times per year is already often, but it could be also only once every three years. For the proposed preferred system, no shut down of its turbine is required for survey of installation area, for installation, and for maintenance of the rotary atomisers. For that reason, the fogging system can be installed quickly, while other cooling systems (evaporative coolers, high pressure fogging systems, or chillers) require to wait for the next shut down to survey the installation area and then one has to wait for the second next shut down for installation. During this waiting time, the proposed system is already generation benefits and its installed capital expense is already payed back, before a conventional system is even installed.

The fogging system preferably further comprises a source of non-demineralised water. According to the invention, demineralised water is not required due to the rotary atomisers and, among other things, due to the possibility to use low water pressure and simple nozzle design. Thus, no capital expenses and operational expenses on water demineralization are required. Demineralised water could create corrosion issues, since it extracts minerals from metals. For that reason, the system would need to be built from high quality expensive stainless steel, if demineralised water was used. This applies to a high pressure piping, nozzles, a filter house and its components and in particular to internal gas turbine parts, e.g. turbine blades. Experience has shown that demineralized water often requires additional treatment if it is to be used for gas turbine inlet air cooling. Demineralization generally removes ionic material (minerals that are dissolved in the water in ion form) but does not remove colloidal material. For some installations, it is not possible to install water demineralisation units at all. For example, on oil & gas rigs, there is limited space and the topside weight of the platform might be limited as well. On the other side, these platforms have excess amounts of salt water that can be used. Accordingly, in an alternative solution, the fogging system further comprises a source of salt-water, a source of low water-purity water, or a source of non sub-micron particle filtered water. Sub-micron solid particles don't need to be filtered out, as the low pressure nozzles of the rotary atomisers according to the invention are not sensitive to wear. Wear would affect droplet size on high pressure nozzles. Instead the droplet size of the inventive system is determined by a screen rotation of its rotary atomisers.

The device is preferably protected by air filtration, and the fogging system is then preferably located upstream of one or more hydrophobic inlet air filters. Hydrophobic filters are advantageously provided to prevent saltwater penetration to a turbine. Filters could get wet due to high ambient relative humidity or a failure of the fogging control system. The captured salt on the filters could then deliquesce and penetrate the filters. Water resistance or tightness filters prevent this.

The device is further preferably protected by air filtration, and inlet air filters are then preferably made of the class EPA, HEPA, or ULPA, in particular according to EN1822:2009 to capture salt crystals that can be formed when water droplets evaporate.

The plurality of rotary atomisers is preferably equipped with variable frequency drive.

The fogging system preferably further comprises: a source of water at low pressure; and a modulating control valve to substantially continuously provide variable water flow rate. Low pressure water enables the system of the invention to require lower capital expenses on piping and lower operational expenses due to less energy consumption of low pressure pumps, and to have a quicker installation. Water flow rate may be continuously controlled by a proportional controlled flow valve. High pressure fogging systems need constant line pressure for maintaining the same droplet size. Therefore these systems are separated in up to 24 individual sub-systems, each containing a certain amount of nozzles and an individual high pressure pump with constant flow rate. The emitted water content is controlled by activation or deactivation a certain number of sub-systems. The total water flow emitted into the air stream is therefore controlled by step changes. For that reason, according to the invention, humidity of the inlet air can be controlled more precisely by means of rotary atomizers, in contrast to high pressure fogging systems.

Further preferred, the fogging system comprises: a water holding tank with automatic level controls; and a low pressure circulating water pump with variable frequency drive to provide substantially continuously variable water quantity.

Advantageously, the fogging system further comprises: a high capacity first stage fogging system upstream of one or more inlet air filters that provides a majority of total air cooling, wherein a first control system substantially continuously modulates water flow rate into the first stage fogging system to achieve a set relative humidity to reduce inlet air temperature as compared to ambient temperature; and a low capacity second stage fogging system downstream of the one or more inlet air filters that provides supplemental cooling to the majority of total air cooling of the first stage fogging system, wherein a second control system controls supplemental cooling to wet bulb temperature.

The high capacity first stage fogging system preferably comprises the plurality of rotary atomisers.

The high capacity first stage fogging system preferably further comprises: a plurality of medium pressure nozzles; a source of water at low pressure; a water holding tank with automatic level controls; and a circulating water pump with variable frequency drive to provide substantially continuously variable water quantity.

The low capacity second stage fogging system preferably comprises: a plurality of air assisted atomisers; a source of water at low pressure; a modulating control valve to substantially continuously provide variable water quantity; a source of air at low pressure; and, a modulating control valve to substantially continuously provide variable air quantity.

The low capacity second stage fogging system preferably further comprises: a plurality of high pressure nozzles; and a fixed speed circulating water pump.

The device is preferably selected from a group consisting of a gas turbine, diesel engine, process blower, other motive force, or general ventilation, clean room.

The present disclosure is further particularly directed towards a two-stage fogging system, and method for controlling said system, designed for cooling of inlet air to a gas turbine, diesel engine, process blower, other motive force, or general ventilation, clean room. The two-stage system comprises a high capacity first stage fogging system that is installed upstream of one or more inlet air filters, where a first stage control system prevents increase in filter differential pressure, and a low capacity second stage fogging system that is installed downstream of one or more inlet air filters, where a second control system controls supplemental cooling to the majority of total air cooling of the first stage fogging system to the wet bulb temperature. Wet bulb temperature is the temperature air would be if cooled to complete saturation, or 100% relative humidity, by evaporation of water into the air.

In some embodiments the first stage of the system may contain a plurality of rotary atomisers with variable frequency drive, a source of water at low pressure, and, a modulating control valve to provide variable water quantity. In other embodiments the first stage of the system may contain of the above and a water holding tank with automatic level controls, a modulating control valve and a fixed speed or low pressure circulating water pump.

In other embodiments the first stage of the system may contain a plurality of rotary atomisers with variable frequency drive, a source of water at low pressure, a water holding tank with automatic level controls, and a circulating water pump with variable frequency drive that may substantially continuously provide variable water quantity.

In still other embodiments the first stage of the system may contain a plurality of medium pressure nozzles, a source of water at low pressure a water holding tank with automatic level controls, and a circulating water pump with variable frequency drive that may substantially continuously provide variable water quantity.

In some embodiments the second stage of the system may contain a plurality of air assisted atomisers, a source of water at low pressure, a modulating control valve that may substantially continuously provide variable water quantity, a source of air at low pressure, and a modulating control valve to substantially continuously provide variable air quantity. In some embodiments the source of the air at low pressure may be a compressor. In other embodiments the second stage of the system may further contain a water holding tank with automatic level controls and a fixed speed circulating water pump.

In other embodiments the second stage of the system may contain a plurality of high pressure nozzles and a fixed speed circulating water pump.

In some embodiments the first stage control system of two-stage fogging system may utilize a set point of relative humidity that is calculated according to filter differential pressure and relative humidity curves. The control system may utilize a set point of differential pressure within an expected operating range. The control system may utilize a set point of downstream temperature between ambient temperature and wet bulb temperature. In all cases a closed loop control system is used to achieve the desired set point by adjusting the water flow rate to the atomisers.

In some embodiments the second control system of the two-stage fogging system may utilize an on/off switch operated by operator preference for supplemental cooling to wet bulb temperature.

The present disclosure also includes a method of control for a two-stage fogging system that includes adding water droplets to the ambient air supplied to a device via a filter house. The method of control for the first stage of the fogging system may include: controlling the water flow rate to a plurality of first stage atomisers, measuring the differential pressure, and adjusting the rate of water to the first stage atomisers according to a set point of relative humidity. The method of control for the first stage of the fogging system may include: controlling the water flow rate to a plurality of first stage atomisers, and adjusting the rate of water to the first stage atomisers according to a pre-determined set point of relative humidity. The method of control for the first stage of the fogging system may include: controlling the water flow rate to a plurality of first stage atomisers, measuring the downstream temperature, and adjusting the rate of water to the first stage atomisers according to a set point of downstream temperature. The method of control for the second stage of the fogging system may comprise turning a plurality of second stage nozzles on/off according to operator preference for supplemental cooling to wet bulb temperature.

In some embodiments, the device to be combined with the two stage system may be selected from a group consisting of a gas turbine, diesel engine, process blower, other motive force, or general ventilation, clean room.

In some embodiments, the plurality of first stage atomisers may be positioned about 1 meter upstream of the filter house. In other embodiments, a plurality of first stage atomisers may be positioned upstream and adjacent the filter house. In other embodiments, a plurality of first stage atomisers may be positioned downstream of a number of filter stages, and upstream of the final filter stage.

In some embodiments, the plurality of low capacity second stage foggers (e.g. atomiser or nozzles) may be positioned downstream of the filter house.

A two-stage system for reducing the inlet air temperature of a gas turbine is described, where a first stage comprises a high capacity fogging system positioned upstream of a filter that is capable of achieving up to about 90% of the air cooling potential between ambient temperature and wet bulb temperature, and a second stage comprises a low capacity fogging system positioned downstream of a filter that is capable of achieving about 10% of cooling.

A two-stage fogging system for reducing the inlet air temperature of a gas turbine that includes one or more filters. A first stage positioned upstream of the one or more filters and including one or more rotary atomisers that is capable of achieving up to about 90% of the air cooling potential between ambient temperature and wet bulb temperature. A second stage positioned downstream of the one or more filters and including one or more nozzles that is capable of achieving about 10% of the supplemental air cooling towards wet bulb temperature.

A further embodiment is set forth including a method of control for a fogging system for reducing the inlet air temperature of a gas turbine, wherein the method may comprise: introducing water droplets into the air upstream of the filter; measuring the ambient temperature, ambient relative humidity, and ambient air pressure; measuring the temperature, relative humidity, and air pressure immediately following the filter; calculating the differential pressure value; maintaining a set relative humidity after the filter, where the set relative humidity is determined according to differential pressure/relative humidity curve; and controlling a water flow rate to achieve the set relative humidity, where increasing the water flow rate increases the relative humidity, and decreasing the water flow rate decreases the relative humidity.

A further embodiment is set forth including a method of control for a fogging system for reducing the inlet air temperature of a gas turbine, wherein the method may comprise: introducing water droplets into the air upstream of the filter; measuring the ambient temperature, ambient relative humidity, and ambient air pressure; measuring the temperature, relative humidity, and air pressure immediately following the filter; calculating the differential pressure value; maintaining a set temperature after the filter, where the set temperature is at a value between ambient temperature and wet bulb temperature; and controlling a water flow rate to achieve the set temperature, where increasing the water flow rate decreases the downstream temperature, and decreasing the water flow rate increases the downstream temperature.

In some embodiments the set relative humidity may be about 80% to about 95%. In other embodiments, the set relative humidity may be about 90%.

In some embodiments controlling the water flow rate may further comprise actuation of a modulating control valve.

In some embodiments controlling the water flow rate may further comprise actuation of a variable frequency drive pump.

In some embodiments, a system for reducing inlet air temperature of a motive force protected by air filtration may include a high capacity first stage fogging system and a low capacity second stage fogging system. The high capacity first stage fogging system upstream of one or more inlet air filters provides a majority of total air cooling wherein a first control system substantially continuously modulates water flow rate into the first stage fogging system to achieve a set relative humidity to reduce inlet air temperature as compared to ambient temperature. The low capacity second stage fogging system downstream of the one or more inlet air filters provides supplemental cooling to the majority of total air cooling of the first stage fogging system, wherein a second control system controls supplemental cooling to wet bulb temperature. The first stage fogging system achieves about 80% to about 95% of the majority of total air cooling. A set relative humidity of the first control system may be calculated through selection of a point with highest relative humidity on a differential pressure and relative humidity curve prior to an exponential increase in differential pressure on the curve. A set point of minimum temperature after cooling of the first control system may be selected to avoid problems of capacity constraint in downstream equipment due to high ambient temperature. A set point of minimum temperature after cooling of the first control system may be selected to avoid problems of icing at the compressor bell mouth. A set point of maximum filter differential pressure of the first control system may be selected as a fail-safe mechanism in the event of a sudden increase of differential pressure due to environmental conditions such as an ingress of hygroscopic material onto the filters. The second control system may utilize an on/off switch operated by an operator preference for supplemental cooling to wet bulb temperature. The high capacity first stage fogging system may include a plurality of rotary atomisers with variable frequency drive, a source of water at low pressure, and a modulating control valve to substantially continuously provide variable water flow rate. The high capacity first stage fogging system may include a water holding tank with automatic level controls and a low pressure circulating water pump with variable frequency drive to provide substantially continuously variable water quantity. The source of air at low pressure may be a compressor. The high capacity first stage fogging system may include a plurality of medium pressure nozzles, a source of water at low pressure, a water holding tank with automatic level controls, and a circulating water pump with variable frequency drive to provide substantially continuously variable water quantity. The low capacity second stage fogging system may include a plurality of air assisted atomisers, a source of water at low pressure, a modulating control valve to substantially continuously provide variable water quantity, a source of air at low pressure, and a modulating control valve to substantially continuously provide variable air quantity. The low capacity second stage fogging system may include a plurality of high pressure nozzles and a fixed speed circulating water pump.

Another embodiment may include a two-stage fogging system for reducing the inlet air temperature of a gas turbine. The two-stage fogging system may include one or more filters, a first stage, and a second stage. The first stage may be positioned upstream of the one or more filters and include one or more rotary atomisers that is capable of achieving about 90% of the air cooling towards wet bulb temperature. The second stage may be positioned downstream of the one or more filters and include one or more nozzles that is capable of achieving about 10% of the supplemental air cooling towards wet bulb temperature.

Another embodiment may include a method of control for a fogging system for reducing the inlet air temperature of a device. The method may include measuring the ambient temperature, ambient relative humidity, and ambient air pressure, introducing water droplets into the air upstream of the filter, measuring the temperature, relative humidity, and air pressure downstream from the filter, and calculating a differential pressure value, maintaining a set relative humidity after the filter wherein the set relative humidity is determined according to differential pressure relative humidity curves, and controlling a water flow rate to achieve set relative humidity such that increasing the water flow rate increases the relative humidity and decreasing the water flow rate decreases the relative humidity. The set relative humidity may be about 80% to about 95%. The set relative humidity may be about 90%. The step of controlling the water flow rate may include turning a valve a quarter-turn at a time. The device may be selected from a group consisting of a gas turbine, diesel engine, process blower, other motive force, general ventilation, clean room. Further, the set point of relative humidity may be calculated by selecting of a point with highest relative humidity on a differential pressure and relative humidity curve prior to an exponential increase in differential pressure on the curve.

It should be appreciated that all combinations of the foregoing concepts and additional concepts discussed in greater detail below provided such concepts are not mutually inconsistent are contemplated as being part of the subject matter disclosed herein. In particular, all combinations of claimed subject matter appearing at the end of this disclosure are contemplated as being part of the subject matter disclosed herein.

According to that, in a preferred embodiment of the system according to the invention, the first stage fogging system achieves about 80% to about 95% of the majority of total air cooling.

In another preferred embodiment, the set relative humidity of the first control system is calculated through selection of a point with highest relative humidity on a differential pressure and relative humidity curve prior to a steep increase of the differential pressure or prior to an exponential increase in differential pressure on the curve.

In yet another embodiment, a set point of minimum temperature after cooling of the first or second control system is selected to avoid problems of capacity constraint in downstream equipment due to high ambient temperature.

According to a further preferred embodiment, a set point of minimum temperature after cooling of the first or second control system is selected to avoid problems of icing at the compressor bell mouth.

In a further embodiment, a set point of maximum filter differential pressure of the first control system is selected as a fail-safe mechanism in the event of a sudden increase of differential pressure due to environmental conditions such as an ingress of hygroscopic material onto the filters.

Further preferred, the second control system utilizes an on/off switch operated by an operator preference for supplemental cooling to wet bulb temperature.

Finally preferred, the invention refers to a system for reducing inlet air temperature of a device protected by air filtration, comprising: a first stage fogging system upstream of one or more inlet air filters that provides inlet air cooling, wherein a first control system controls cooling to achieve a set relative humidity of the inlet air; and a second stage fogging system downstream of the one or more inlet air filters that provides supplemental cooling to the first stage fogging system, wherein a second control system controls supplemental cooling to wet bulb temperature of the inlet air.

DETAILED DESCRIPTION OF THE PREFERRED EMBODIMENTS

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
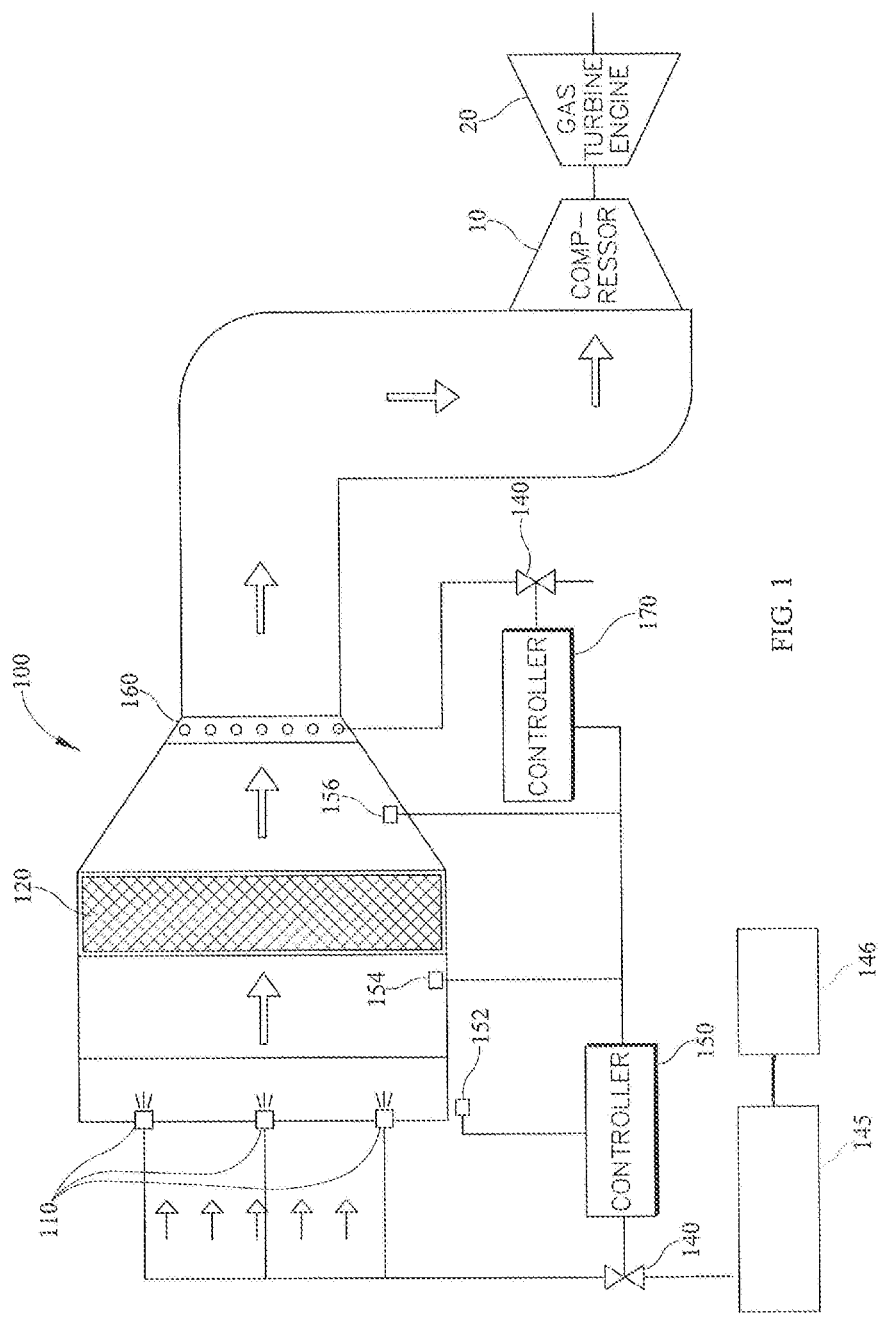
FIG. 1 is a schematic view of a gas turbine engine with a two-stage fogging system as may be described herein.

As shown in FIG. 1, the inlet air cooling system 100 comprises two stages of fogging. The first stage of the two-stage fogging introduces water, in the form of droplets, into the air stream before the one or more air filters 120. This introduction of water droplets may occur through the use of one or more high capacity rotary atomisers 110. These high capacity rotary atomisers 110 may include an electric motor with a wire cage around the exterior of the motor, such that when the water passes through the wire cage, the wire cage causes the water to break into small particles or droplets. Due to their high capacity nature, the rotary atomisers are capable of providing a greater water flow rate, for example as measured in litres of water per minute, to the air stream as compared to traditional high pressure nozzles. For example, rotary atomisers may provide about 0.5 to about 3.0 litres of water per minute to the air stream at a droplet size of about 40 to about 70 microns, compared to traditional high pressure nozzles used for in-duct fogging where the average capacity is about 0.18 litres per minute. Further, rotary atomisers are capable of accepting a range of water quality without detrimental effect. Therefore, the rotary atomisers do not require demineralized water and may use any available potable water source. These rotary atomisers have variable frequency drives, and are capable of running from 0% to 100% capacity without affecting the size of the droplets.

Alternatively, other fog generating devices may be used for the introduction of water droplets during the first stage of fogging. For example, medium pressure nozzles or air assisted atomisers that operate between about 5 and about 20 bar can be controlled within acceptable constraints of the droplet size, for example 40 to 70 microns. The current state of the art rotary atomisers may not be suitable for use in some environments, such as for example, but is not limited to, explosion proof environments (e.g. refineries). In these types of environments a high capacity nozzle with an explosion-proof pump may be alternatively used to achieve the first-stage cooling.

Rotary atomisers 110, or alternate first stage fog generation devices, are placed upstream of the one or more filters 120. Generally, the rotary atomisers 110 are placed about 1 meter upstream of the filters, which may place them inside of a weather hood or even in the filter house, depending on the dimensions of the particular set-up. The positioning of the atomisers before the filtering media of about 1 meter allows for the water to evaporate before hitting the filter, preventing the filter from becoming saturated with water. However, if the filter utilizes a droplet catcher (such as for example AAF International's AmerDrop system) or a weather louver (such as for example AAF International's AmerVane product) then the placement of the atomiser may be immediately upstream of the filter within the filter house. Additionally, where a filter has a hydrophobic coalescing media (such as for example AAF International's AMER-SHIELD and AMERKOOL products), containing glass fibres and oils, the moisture will coalesce to form larger droplets which drain out of the airstream, which may also allow the placement of the atomiser to be immediately upstream of the filter within the filter house. Preferably, the filter contains some device or coating that protects the filter from condensation, droplets, or water hitting the filter, which may cause an increase in differential pressure. More preferably, the filter contains a coalescing part or a weather louver, such that water is prevented from passing through the filter without a decrease in differential pressure. The use of these hydrophobic filters allows for the first-stage fogging system to enact evaporative cooling with negligible risk of water downstream of the one or more filters 120, protecting the compressor's 10 intake.

Unlike conventional high pressure nozzles used downstream of the filter house, the volume and flow rate of water supplied to the first-stage fogger (such as for example a rotary atomiser) may be controlled through a modulating control valve 140, for example a globe valve or a small tank with a variable frequency drive pump attached, without affecting droplet particle size. The first controller or control system 150 receives signals, in the form of, for example, measurements of temperature, relative humidity, and pressure from both one or more sensors 152, 154 located before the filter 120 and one or more sensors 156 after the filter 120. Measurement of the pressure before and after the filter allows for the controller to calculate the differential pressure. Differential pressure is a calculation of the difference between the pressures measured at two points, here, the points are before the filter and after the filter. The first controller 150 utilizes these measurements in order to control the flow rate of water supplied in order to reach a desired relative humidity, with reduced affect to differential pressure. Differential pressure is a calculation of the difference between the pressures measured at two points; here, the two points are before the filter and after the filter. For example in a system where pressure is measure before and after the filter stage water hitting the filter may cause an increase in differential pressure. A closed loop substantially continuously controls or modulates the water flow rate from the relative humidity measurements. Additionally, it is also possible to control the system to regulate downstream temperature and differential pressure. Control of downstream temperature may be desired due to capacity constraints of downstream equipment (for example an alternator) at high ambient temperature. For example, selecting a set point of minimum temperature after cooling of the first control system may avoid problems of capacity constraint in downstream equipment due to high ambient temperature. Further by example, selecting a set point of minimum temperature after cooling of the first control system may avoid problems of icing at the compressor bell mouth. Also, a set point of maximum filter differential pressure of the first control system is selected as a fail-safe mechanism in the event of a sudden increase of differential pressure due to environmental conditions such as an ingress of hygroscopic material onto the filters.

FIG. 1 further indicates a water holding tank with automatic level controls 145, and a low pressure circulating water pump with variable frequency drive 146.

Figure 2:
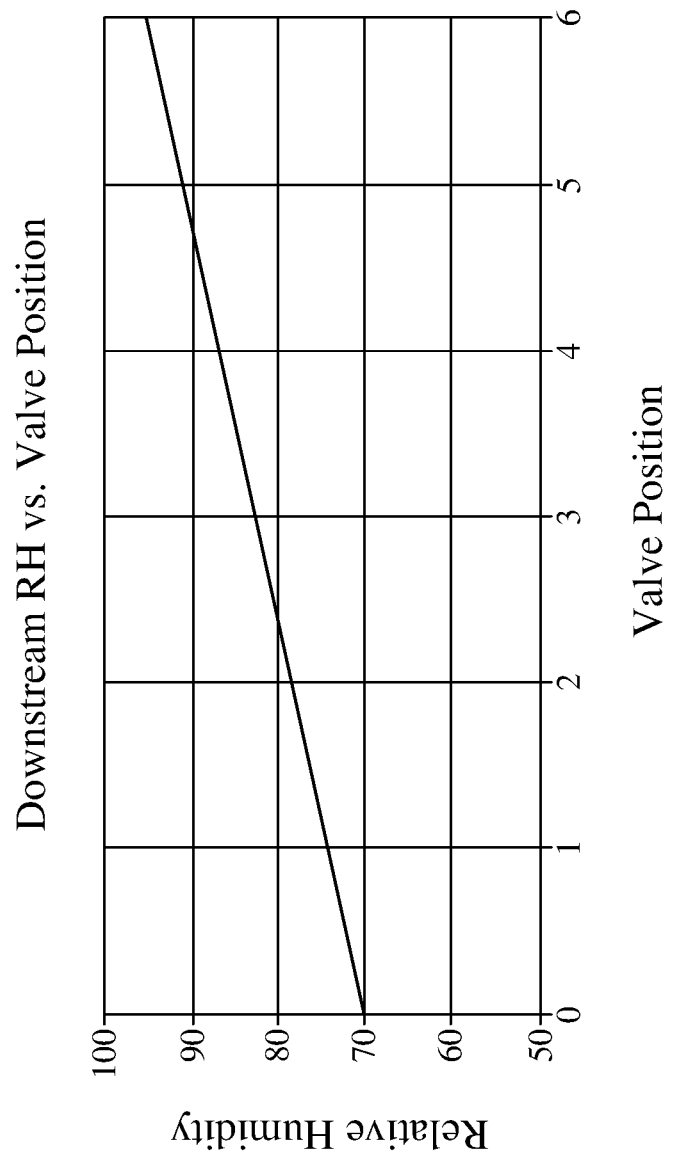
FIG. 2 is a graph showing measurements of downstream relative humidity as a function of modulating valve position, at ambient 70% relative humidity before, during, and after first-stage fogging using the two stage fogging system described herein.
Figure 3:
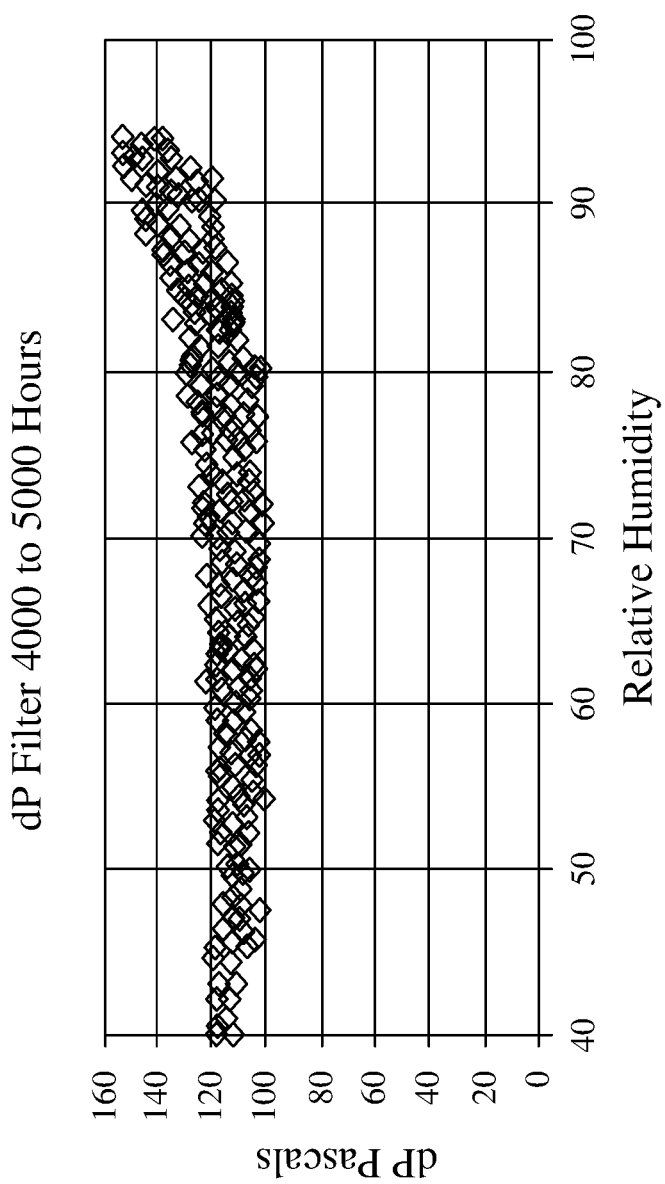
FIG. 3 is a graph showing the relationship between filter differential pressure and relative humidity curve, for a typical in-service filter which would be downstream of the first stage fogging using the two stage fogging system described herein.
Figure 4:
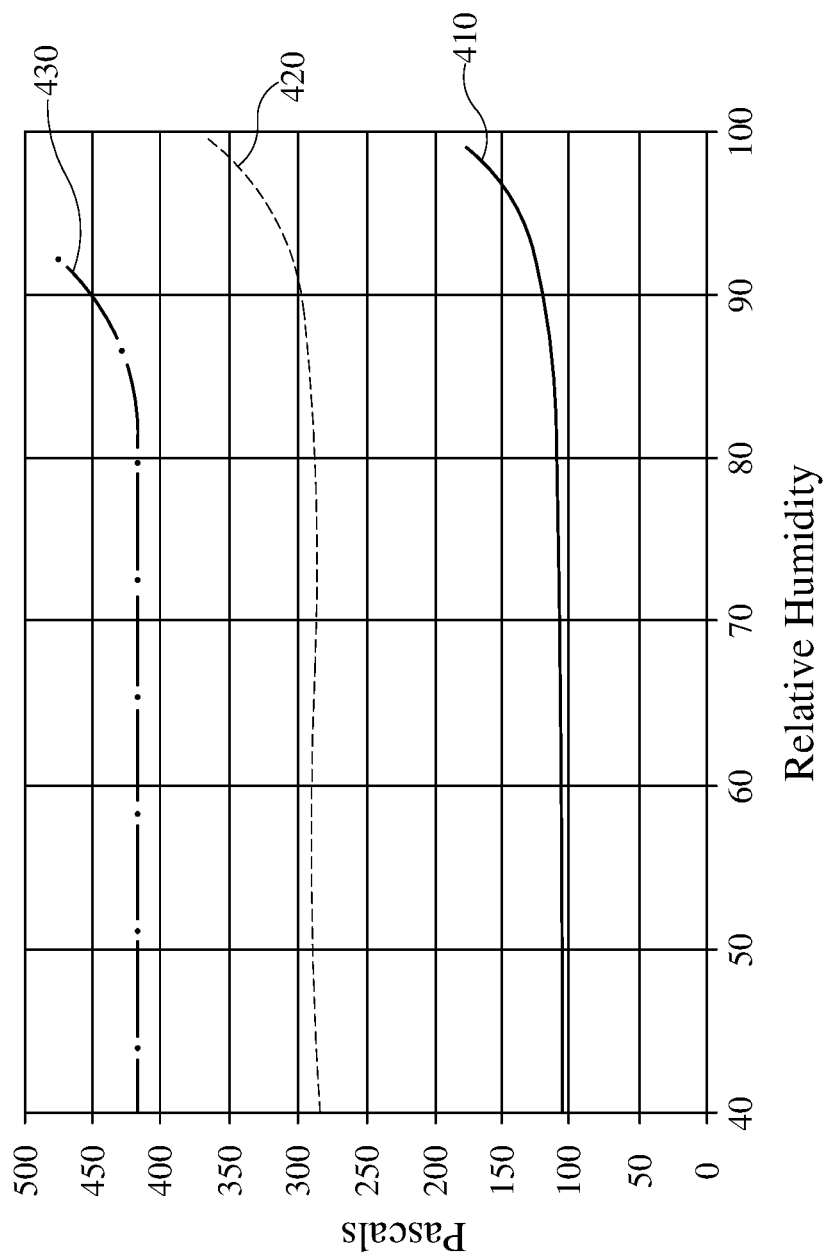
FIG. 4 is a graph showing filter differential pressure and relative humidity curves using the two stage fogging system described herein.

Generally, the first-stage fogging system is controlled through maintaining a set point of relative humidity, determined according to filter differential pressure and relative humidity curves. It has been observed that downstream relative humidity can be controlled precisely by manually or automatically controlling water flow rate. FIG. 2 shows a straight line relationship between relative humidity and valve position. FIG. 2 is an example observation where the ambient relative humidity was 70%, and the downstream relative humidity was adjusted up to 90%. This set relative humidity is calculated through selection of a point from filter differential pressure and relative humidity curves, as shown in FIG. 3 and FIG. 4. The differential pressure and relative humidity curve of FIG. 3 is generated by plotting the relative humidity (x-axis) by the differential pressure (y-axis). The curve shows the relationship of between these two variables, for example the differential pressure may remain constant while relative humidity increases. These curves indicate at what relative humidity measurement, or range of measurements, the differential pressure may increase. This allows for the controller to set the point with a maximum relative humidity as high as possible without affecting differential pressure. FIG. 3 shows the relationship between differential pressure and relative humidity for a mini-pleat filter with hydrophobic media, with data gathered between 4000 and 5000 running hours.

As shown in FIG. 4, the filter differential pressure and relative humidity curves may be different for various types of filters, such as AAF's HydroVee filter 410 or AAF's AstroCel filter 420 or AAF's DuraCel filter 430. However, as generalized in FIGS. 3 and 4 there is an increase in the filter differential pressure as relative humidity reaches about 90%. Therefore, the target relative humidity should be preferably set at about 80% to about 95%. Even more preferably the target relative humidity should be set at about 90%. The first-stage fogging system, which can finely control relative humidity, can be used to control the temperature and relative humidity without causing spikes of differential pressure. To achieve this temperature control, the water flow rate may be finely controlled through small incremental turns of the modulating control valve 140. This fine control of the water flow rate, combined with set maximum relative humidity (as determined by differential pressure relative humidity curves) allows the first controller 150 to finely control the temperature, such that when the water flow rate is increased slightly, the relative humidity increases slightly and thus the temperature also decreases slightly.

Figure 5:
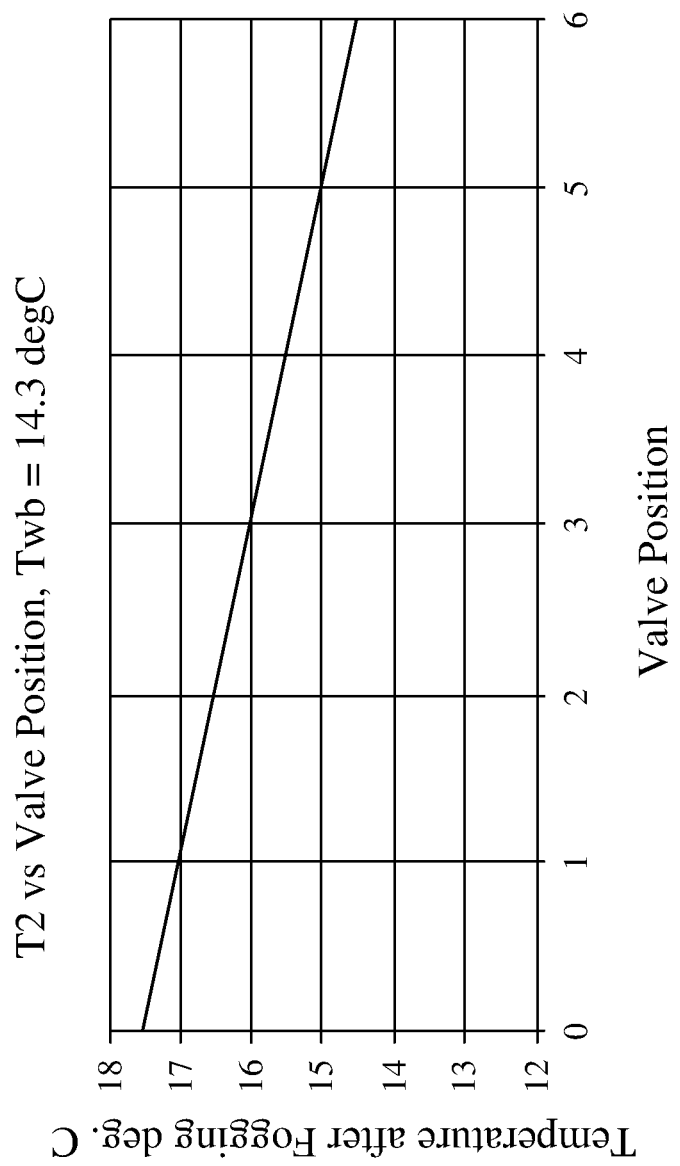
FIG. 5 is a graph showing measurements of downstream temperature as a function of modulating valve position, at ambient 14.3 degrees Celsius wet bulb temperature before, during, and after first-stage fogging using the two stage fogging system described herein.

FIG. 5 shows a straight line relationship between downstream temperature and valve position for a given set of ambient conditions. This indicates that a set point temperature between ambient temperature and wet bulb temperature can be controlled by adjusting the water flow rate through controller 150. The control system can therefore be set to provide a depressed temperature after cooling, with an automatic maximum relative humidity which avoids deleterious effects on filter differential pressure.

A thermal efficiency measurement indicates the efficiency of evaporative cooling of the first-stage fogging (e.g. rotary atomisers). Thermal efficiency is calculated as follows:

$$\text{Thermal Efficiency} = \frac{\text{ambient temperature} - \text{measured temperature}}{\text{ambient temperature} - \text{wet bulb temperature}}$$

As the water flow rate increases, the relative humidity increases in proportion, as the thermal efficiency trends with relative humidity. Further, the relationship between thermal efficiency and water flow rate is mostly linear, such that when the water flow rate increases, so does the thermal efficiency. Therefore, in this two-stage cooling system, about 90% of the total cooling achieved by the system may be achieved through the first-stage fogging system (for example through the use of rotary atomisers). The first stage fogging system has been demonstrated to achieve 100% thermal efficiency at high relative humidity. By controlling set point relative humidity to approximately 90%, the first stage fogging is deliberately constrained to approximately 90% efficiency.

Figure 6:
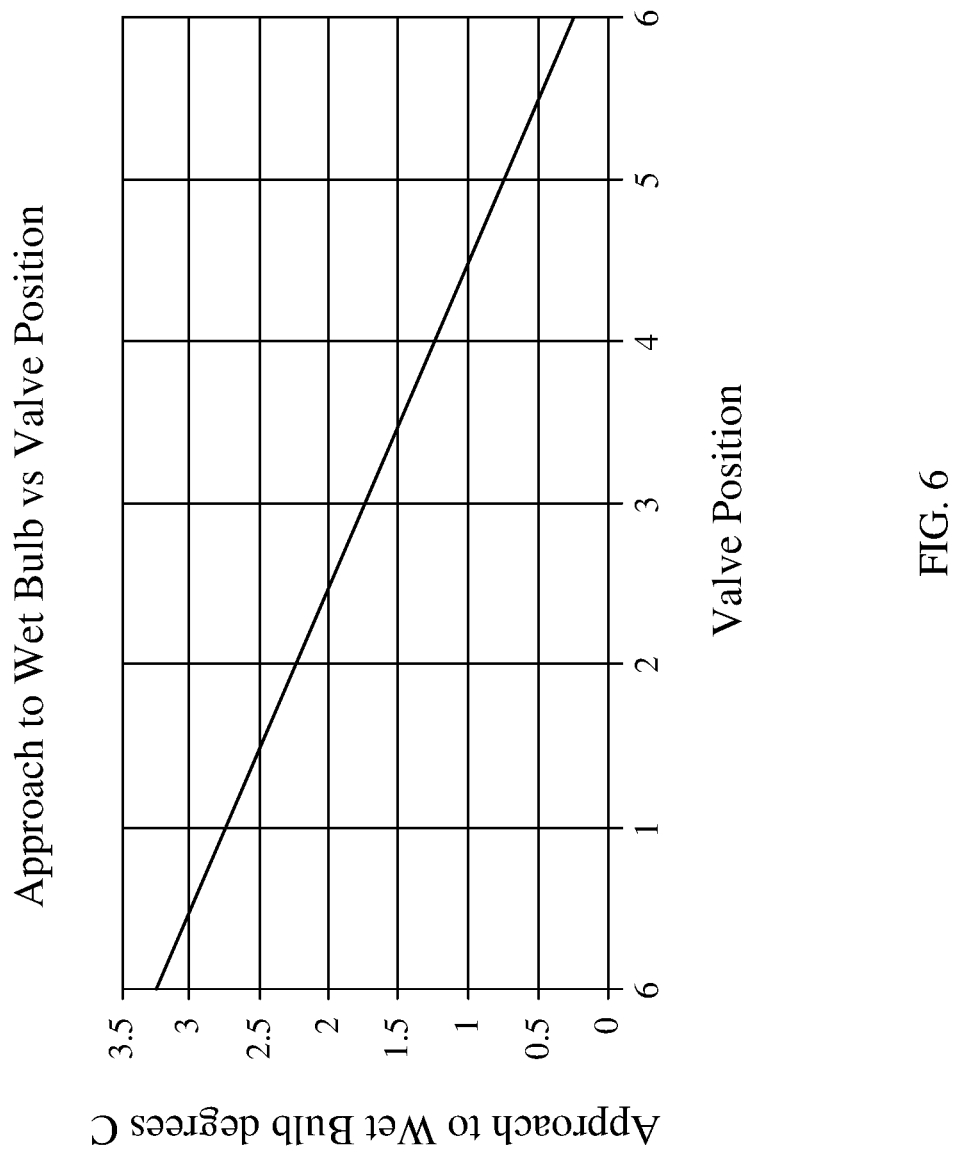
FIG. 6 is a graph showing measurements of the approach to wet bulb temperature as a function of modulating valve position, at ambient 14.3 degrees Celsius wet bulb temperature before, during, and after first-stage fogging using the two stage fogging system described herein.

An alternate measure of evaporative cooling efficiency, particularly useful in moderate climates, is the approach to wet bulb temperature. FIG. 6 shows first stage fogging system achieving an approach of less than 0.5 degrees Celsius, with a linear relationship between valve position (water flow rate) and approach to wet bulb temperature.

In particular instances it may be preferable to maintain a certain temperature downstream of the filter, in these instances the first control system may limit the flow rate of water in order to achieve a particular downstream temperature based on site requirements at each stage. This allows for fine control in situations where the ambient temperature is high and extra power is desired, but generator output is the constraining variable in a gas turbine power generation set. Additionally, where there is a marked change in the differential pressure, or when differential pressure falls outside of a specified range, the control system 150 may be programmed to set an alarm or alternatively make proactive in-line modifications such as to trim the water flow rate. This alarm or indicator may be any kind of alarm or notification, including visual, audible, or any combination of the two. However, due to dust and particle build up from incoming air in the filter, the differential pressure increases with the age. For example, the differential pressure may increase a few Pascals from when the filter was new as compared to a filter aged to about 12 to about 24 months old. Therefore, a static control utilizing a set differential pressure is not preferable.

In some embodiments the first-stage fogging system may have a source of low pressure water and a modulating control valve 140 to substantially continuously provide variable water quantities. In other embodiments the system may further comprise a water holding tank with automatic level controls and a fixed speed circulating pump.

In some embodiments the first stage fogging system may have a source of low pressure water, a water holding tank with automatic level control, and a low pressure circulating water pump with variable frequency drive in order to substantially continuously provide variable water quantity.

Figure 7:
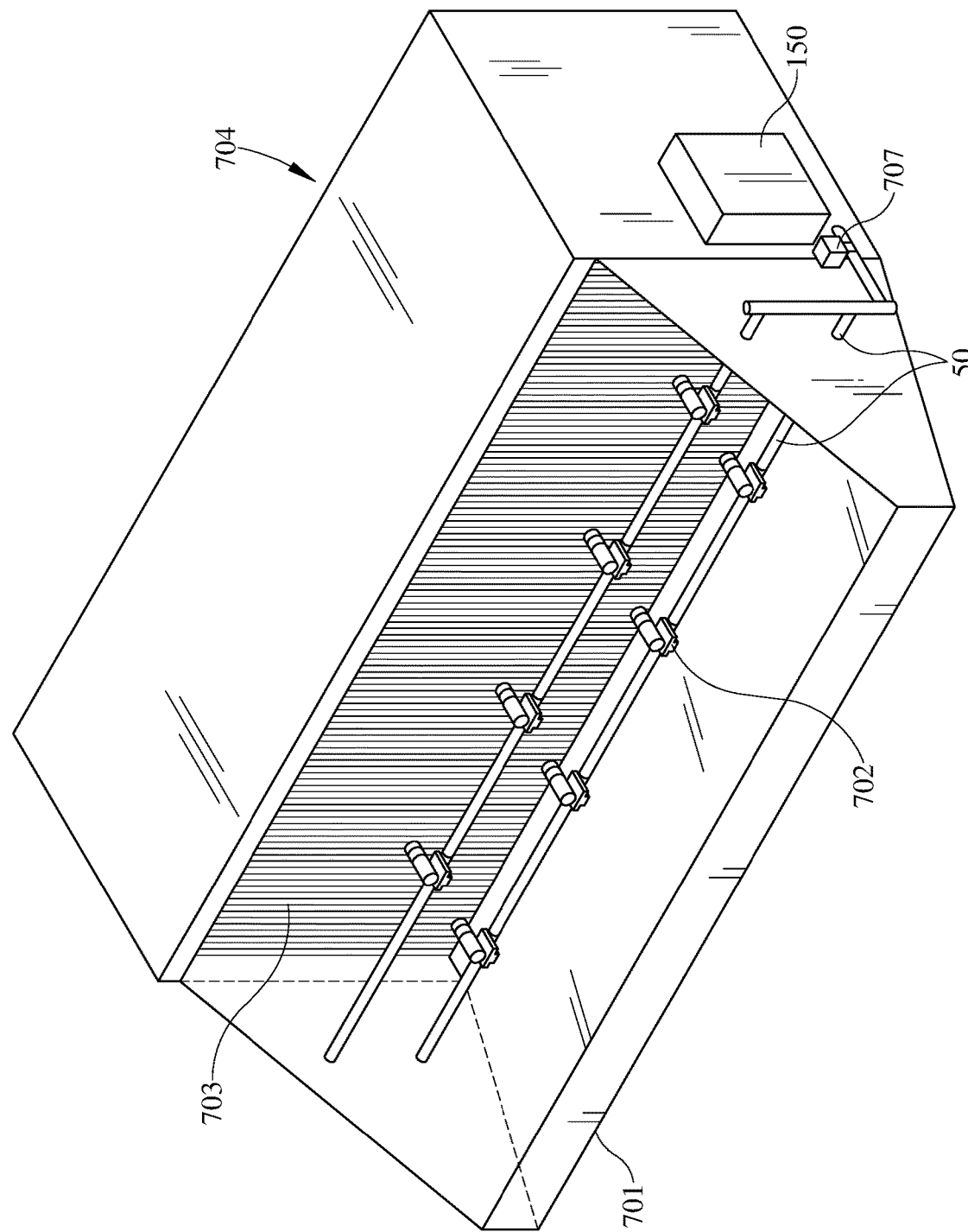
FIG. 7 is a perspective view of one embodiment of the two stage fogging system described herein for the rotary atomiser and control panel embodiment.

Front-facing or first stage fogging systems may be installed or retrofitted onto existing filter housings. For retrofitting, a frame may be placed inside of the weather hood or inside the filter house to which the first-stage foggers are attached. Alternatively first stage foggers may be supported directly on the same pipe which supplies water to each fogging unit. Sensors that measure the relative humidity, temperature, and pressure may be placed before the one or more filters 703 such as with sensors 152, 154 and after the one or more filters with sensor 156. Sensors may be connected to the control system 150 or in communication therewith. As shown in FIG. 7, where retrofitted, the first stage fogging devices 702 may be supported on the supply pipe 50 inside weather hoods 701 or a filter house 704. One embodiment uses a modulating control valve 707, actuated via the control system 150. Retrofitting allows for the use of existing systems, reduces installation time, and eliminates the need to shut down the gas turbine for installation or for inspection of the front facing foggers. The first-stage fogging system achieves fine control of inlet air relative humidity and temperature, while maintaining downstream filter differential pressure in an acceptable range. Additionally, the fine control of the first-stage fogging system may prevent problems with over-supply of water often seen in state of the art systems.

The second stage of the two-stage fogging introduces water, in the form of droplets, into the air stream after the air filters 120 from one or more plurality of low capacity nozzles 160 to provide supplemental cooling towards the wet bulb temperature. These low capacity nozzles may be high pressure nozzles, or alternatively may be air assisted nozzles. In embodiments utilizing high pressure nozzles, a water tank with automatic level control and a fixed speed circulating pump may be used. In embodiments utilizing air assisted nozzles, a source of air at low pressure, such as an air compressor, and a modulating control valve 140 to substantially continuously provide variable air quantity may be used. Generally, however, these second stage delivery systems provide water at a significantly reduced flow rate as compared to the first stage.

Due to the efficiency of the first-stage fogging, using for example one or more rotary atomisers 110 which achieve about 90% of the total two-stage system cooling, only a small plurality of low capacity nozzles 160 may be used in the second fogging stage to supplement cooling to the wet bulb temperature. The second stage of the cooling may be desired to achieve only about 10% of the total cooling, this reduced cooling load uses a small plurality of nozzles to achieve.

These low capacity nozzles 160 may be controlled through a second controller or control system 170 reduced to a binary (on/off) function. The decision to turn the second stage fogging on or off may be dependent on ambient relative humidity or a plant operator decision regarding whether the air inlet to the drive requires supplemental cooling to the wet bulb temperature from the second-stage system. For example, this binary control system may switch on or off when the temperature, as measured by the sensor 156 after the filter 120, is above a set value. The low capacity nozzles 160, because of their small plurality, may be positioned around the periphery of the duct at the location downstream of one or more filters 120. Positioning the nozzles 160 around the periphery of the duct decreases complexity of the system, which reduces the cost and downtime required for the installation and maintenance of the nozzles. Additionally, the minimization of hardware in the clean air stream decreases the risk of a foreign object (for example metal from a nozzle) falling into the gas turbine engine or system 20.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Further, it is to be understood that continuously or substantially continuously may include one or more interruptions, delays, etc. in controlling characteristics such as but not limited to the quantities, rates, measurements disclosed herein and still be within the scope of the embodiments. Alternatively, control or adjustments may be considered or provided intermittently.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." When used in this description and the claims as an adjective rather than a preposition, "about" means "approximately" and comprises the stated value and every value within 10% of that value. For example, "about 100%" would include measurements of 90% and 110%, as well as every value in between. The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

EXAMPLES

Example 1

Figure 8:
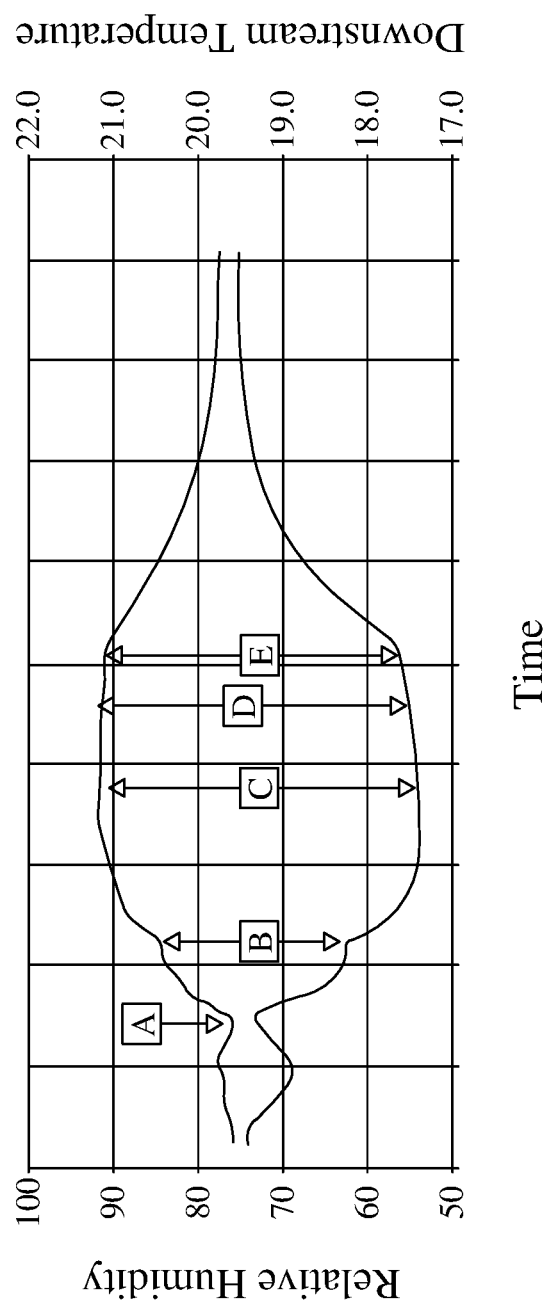
FIG. 8 is a graph showing measurements of inlet air conditions before, during, and after first-stage fogging using the two stage fogging system described herein.

An on-plant inlet cooling trial was conducted demonstrating that the first stage fogging, and associated control system, may control temperature and relative humidity by simply adjusting the water flow rate to the first-fogging system (e.g. rotary atomiser). The trial began by first allowing the inlet conditions to stabilize before the rotary atomiser was turned on. After the inlet conditions stabilized the rotary atomiser was started with a water flow rate of 0.5 litres per minute (A of FIG. 8), at this point the temperature immediately begins to drop from about 19.5° C. to about 18.2° C. and the inlet air relative humidity increases from about 76% to about 84%. An additional increase in water flow rate to 0.7 litres per minute (B of FIG. 8) is tested, and following this increase in the water flow rate the temperature continues to decrease to about 17.5° C. and the inlet air relative humidity increases to about 92%. Incremental decreases in the water flow rate to 0.5 litres per minute (C of FIG. 8) then 0.3 litres per minute (D of FIG. 8), and each cause a slight decrease in the temperature, while relative humidity remained constant. These incremental changes in the water flow rate allows for finer control of the temperature and relative humidity. Once the water flow is turned off (E of FIG. 8) the relative humidity and temperature slowly return to ambient inlet air measurements. This data indicates that the first-stage fogging system (e.g. rotary atomisers) produce a nearly immediate reduction in temperature and relative humidity. This on-plant test indicates that a relative humidity of about 97% may be achieved within 10 minutes of the system being started.

Example 2

Pressure measurements were taken both before and after the filter house during the on-plant inlet cooling trial as conducted in example 1 allowing the differential pressure to be calculated. When the water rate was increased from 0.5 litres per minute to 0.7 litres per minute (B of FIG. 8) the differential pressure begins to increase to its peak of 460 Pascals. This maximum is reached and began declining prior to the incremental decrease of the water flow rate to 0.5 litres per minute (C of FIG. 8). The differential pressure continued to decrease until the after the water flow is turned off (E of FIG. 8), where it stabilizes at about 434 Pascals. The differential pressure measurements can be plotted against the relative humidity to generate a curve showing at what relative humidity measurement the differential pressure increases. The differential pressure relative humidity curve for EXAMPLES 1 and 2 is depicted in FIG. 4. The differential pressure remained constant at approximately 430 Pascals while the relative humidity increased, until the relative humidity measured approximately 87%, at which point the differential pressure begins to increase at an exponential rate.

Example 3

In an embodiment of the two-stage cooling system herein, the ambient temperature at the inlet of the air cooling system was measured at about 50° C. Rotary atomisers were used to generate fog in the first stage of fogging. A maximum relative humidity of 90% (as determined by the differential pressure relative humidity curve) cooled the air to about 26° C. (a 24° C. temperature drop from the ambient air temperature). The second-stage fogging utilized a small plurality of low capacity high pressure nozzles, which provided further cooling of the air to about 24° C. (an additional 2° C. decrease in temperature). The air temperature dropped by a total 26° C. through use of the two-stage system, the majority (about 92%), of which occurred in the first fogging stage. Further, due to the cooling capacity of the first-stage fogging, there was no need to provide overspray cooling in the axial compressor at the compressor inlet.

Finally summarizing, the inventions also refers to a system for reducing inlet air temperature of a motive force protected by air filtration, comprising: a high capacity first stage fogging system upstream of one or more inlet air filters that provides a majority of total air cooling, wherein a first control system substantially continuously modulates water flow rate into the first stage fogging system to achieve a set relative humidity to reduce inlet air temperature as compared to ambient temperature; and a low capacity second stage fogging system downstream of the one or more inlet air filters that provides supplemental cooling to the majority of total air cooling of the first stage fogging system, wherein a second control system controls supplemental cooling to wet bulb temperature.

The first stage fogging system preferably achieves about 80% to about 95% of the majority of total air cooling.

The set relative humidity of the first control system is preferably calculated through selection of a point with highest relative humidity on a differential pressure and relative humidity curve prior to an exponential increase in differential pressure on the curve.

A set point of minimum temperature after cooling of the first control system is preferably selected to avoid problems of capacity constraint in downstream equipment due to high ambient temperature.

A set point of minimum temperature after cooling of the first control system is preferably selected to avoid problems of icing at the compressor bell mouth.

A set point of maximum filter differential pressure of the first control system is preferably selected as a fail-safe mechanism in the event of a sudden increase of differential pressure due to environmental conditions such as an ingress of hygroscopic material onto the filters.

The second control system preferably utilizes an on/off switch operated by an operator preference for supplemental cooling to wet bulb temperature.

The high capacity first stage fogging system preferably comprises: a plurality of rotary atomisers with variable frequency drive; a source of water at low pressure; and a modulating control valve to substantially continuously provide variable water flow rate.

The high capacity first stage fogging system preferably further comprises: a water holding tank with automatic level controls; and a low pressure circulating water pump with variable frequency drive to provide substantially continuously variable water quantity.

The source of air at low pressure preferably is a compressor.

The high capacity first stage fogging system preferably comprises: a plurality of medium pressure nozzles; a source of water at low pressure; a water holding tank with automatic level controls; and a circulating water pump with variable frequency drive to provide substantially continuously variable water quantity.

The low capacity second stage fogging system preferably comprises: a plurality of air assisted atomisers; a source of water at low pressure; a modulating control valve to substantially continuously provide variable water quantity; a source of air at low pressure; and, a modulating control valve to substantially continuously provide variable air quantity.

The low capacity second stage fogging system preferably comprises: a plurality of high pressure nozzles; and a fixed speed circulating water pump.

A two-stage fogging system for reducing the inlet air temperature of a gas turbine comprising: one or more filters; a first stage positioned upstream of the one or more filters and including one or more rotary atomisers that is capable of achieving about 90% of the air cooling towards wet bulb temperature; and a second stage positioned downstream of the one or more filters and including one or more nozzles that is capable of achieving about 10% of the supplemental air cooling towards wet bulb temperature.

Additionally, the inventions also refers to a method of control for a fogging system for reducing the inlet air temperature of a driver, wherein the method comprises: measuring the ambient temperature, ambient relative humidity, and ambient air pressure; introducing water droplets into the air upstream of the filter; measuring the temperature, relative humidity, and air pressure downstream from the filter; calculating a differential pressure value; maintaining a set relative humidity after the filter, wherein the set relative humidity is determined according to differential pressure relative humidity curves; and controlling a water flow rate to achieve set relative humidity, such that increasing the water flow rate increases the relative humidity and decreasing the water flow rate decreases the relative humidity.

The set relative humidity preferably is about 80% to about 95%.

The set relative humidity preferably is about 90%.

Controlling the water flow rate further preferably comprising turning a valve a quarter-turn at a time.

The driver is preferably selected from a group consisting of a gas turbine, diesel engine, process blower, or other motive force.

The set point of relative humidity preferably is calculated by selecting of a point with highest relative humidity on a differential pressure and relative humidity curve prior to an exponential increase in differential pressure on the curve.

The invention claimed is:

1. A system for reducing inlet air temperature of a gas turbine, comprising: an air inlet, a fogging system that provides air cooling, wherein the fogging system comprises at least one rotary atomizer working at a pressure between 0.5 and 6 bar, and one or more inlet air filters, wherein the fogging system further comprises: a high capacity first stage fogging system upstream of one or more inlet air filters that provides a majority of total air cooling, wherein a first control system substantially continuously modulates water flow rate into the first stage fogging system to achieve a set relative humidity to reduce inlet air temperature as compared to ambient temperature; and a low capacity second stage fogging system downstream of the one or more inlet air filters that provides supplemental cooling to the majority of total air cooling of the first stage fogging system, wherein a second control system controls supplemental cooling to wet bulb temperature and not beyond it.

2. The system of claim 1, wherein the at least one atomizer is working at a pressure between 1 and 4 bars.

3. The system of claim 1, wherein the at least one rotary atomizer is equipped with variable frequency drive.

4. The system of claim 1, wherein the entire fogging system further comprises: a source of non-demineralised water.

5. The system of claim 1, wherein the entire fogging system further comprises: a source of salt-water.

6. The system of claim 1, wherein the entire fogging system further comprises: a source of low water-purity water or a source of non sub-micron particle filtered water.

7. The system of claim 1, wherein the one or more inlet air filters are made of the class EPA, HEPA, or ULPA according to EN1822:2009.

8. The system of claim 1, wherein the entire fogging system further comprises:
a source of water at low pressure; and
a modulating control valve to substantially continuously provide variable water flow rate.

9. The system of claim 8, wherein the entire fogging system further comprises:
a water holding tank with automatic level controls; and
a low pressure circulating water pump with variable frequency drive to provide substantially continuously variable water quantity.

10. The system of claim 1, wherein the high capacity first stage fogging system comprises:
the at least one low pressure rotary atomizer.

11. The system of claim 1, wherein the high capacity first stage fogging system comprises:
a plurality of pressure nozzles that operate between 5 and 20 bar;
a source of water at a pressure of 0.5 to 6 bar;
a water holding tank with automatic level controls; and
a circulating water pump with variable frequency drive to provide substantially continuously variable water quantity.

12. The system of claim 1, wherein the low capacity second stage fogging system comprises:
a plurality of air assisted atomizers;
a source of water at a pressure of 0.5 to 6 bar;
a modulating control valve to substantially continuously provide variable water quantity;
a source of air at a pressure of 0.5 to 6 bar; and,
a modulating control valve to substantially continuously provide variable air quantity.

13. The system of claim 1, wherein the low capacity second stage fogging system comprises:
a plurality of high pressure nozzles; and
a fixed speed circulating water pump.

14. The system of claim 1 for reducing inlet air temperature of a gas turbine,
wherein the first control system controls cooling to achieve a set relative humidity of the inlet air; and
the second control system controls supplemental cooling to wet bulb temperature of the inlet air.

15. The system of claim 3, wherein the variable frequency drive of the at least one atomizer is provided by a water pump.

16. The system of claim 3, wherein the variable frequency drive of the at least one atomizer is provided by an electric motor.

17. The system of claim 1, wherein the one or more inlet air filters is hydrophobic.

18. The system of claim 1, wherein the high capacity fogging system achieves up to 90% of the air cooling potential between ambient temperature and wet bulb temperature, and the low capacity fogging system achieves 10% of cooling.

19. A system for reducing inlet air temperature of a device, comprising: an air inlet, a fogging system that provides air cooling, wherein the fogging system comprises:
(i) at least one rotary atomizer working at a pressure between 0.5 and 6 bar, and one or more inlet air filters;
(ii) a high capacity first stage fogging system upstream of one or more inlet air filters that provides a majority of total air cooling, wherein a first control system substantially continuously modulates water flow rate into the first stage fogging system to achieve a set relative humidity to reduce inlet air temperature as compared to ambient temperature; and wherein the high capacity first stage fogging system comprises: (a) a plurality of pressure nozzles that operate between 5 and 20 bar; (b) a source of water at a pressure of 0.5 to 6 bar; (c) a water holding tank with automatic level controls; and (d) a circulating water pump with variable frequency drive to provide substantially continuously variable water quantity; and
(iii) a low capacity second stage fogging system downstream of the one or more inlet air filters that provides supplemental cooling to the majority of total air cooling of the first stage fogging system, wherein a second control system controls supplemental cooling to wet bulb temperature and not beyond it.

20. A system for reducing inlet air temperature of a device, comprising: an air inlet, a fogging system that provides air cooling, wherein the fogging system comprises:
(i) at least one rotary atomizer working at a pressure between 0.5 and 6 bar, and one or more inlet air filters;
(ii) a high capacity first stage fogging system upstream of one or more inlet air filters that provides a majority of total air cooling, wherein a first control system substantially continuously modulates water flow rate into the first stage fogging system to achieve a set relative humidity to reduce inlet air temperature as compared to ambient temperature; and
(iii) a low capacity second stage fogging system downstream of the one or more inlet air filters that provides supplemental cooling to the majority of total air cooling of the first stage fogging system, wherein a second control system controls supplemental cooling to wet bulb temperature and not beyond it; and wherein the low capacity second stage fogging system comprises: (a) a plurality of air assisted atomizers; a source of water at a pressure of 0.5 to 6 bar; (b) a modulating control valve to substantially continuously provide variable water quantity; (c) a source of air at a pressure of 0.5 to 6 bar; and (d) a modulating control valve to substantially continuously provide variable air quantity.

* * * * *